United States Patent [19]

Suzuki et al.

[11] Patent Number: 5,012,795
[45] Date of Patent: May 7, 1991

[54] SELF-HEATING CONTAINER

[75] Inventors: Ryoichi Suzuki, Yokohama; Kunio Yamauchi, Hikone; Choji Kawabata, Tatebayashi; Akira Takeuchi, Fukaya; Koki Ando, Tokyo, all of Japan

[73] Assignee: Nissin Shokuhin Kabushiki Kaisha, Osaka, Japan

[21] Appl. No.: 608,730

[22] Filed: Nov. 5, 1990

Related U.S. Application Data

[62] Division of Ser. No. 395,768, Aug. 18, 1989.

[30] Foreign Application Priority Data

Aug. 18, 1988 [JP] Japan .............................. 63-108529[U]
Nov. 30, 1988 [JP] Japan .............................. 63-156177[U]
Jun. 28, 1989 [JP] Japan .............................. 1-74838[U]

[51] Int. Cl.⁵ .............................................. A47G 23/04
[52] U.S. Cl. ...................................... 126/262; 126/763
[58] Field of Search ................................. 126/262, 263

[56] References Cited

FOREIGN PATENT DOCUMENTS 697846 9/1953 United Kingdom ................ 126/262

Primary Examiner—Carroll B. Dority
Attorney, Agent, or Firm—Marshall, O'Toole, Gerstein, Murray & Bicknell

[57] ABSTRACT

A-self heating container comprising a container with a heater fixed therein. The heater includes a pryogen, a firing agent in contact with and easier to fire than the pyrogen, and an igniter including a rotatably supported striker wheel and a flint mounted for compressive engagement with the wheel. The wheel is rotatably engageable from outside the container.

2 Claims, 5 Drawing Sheets

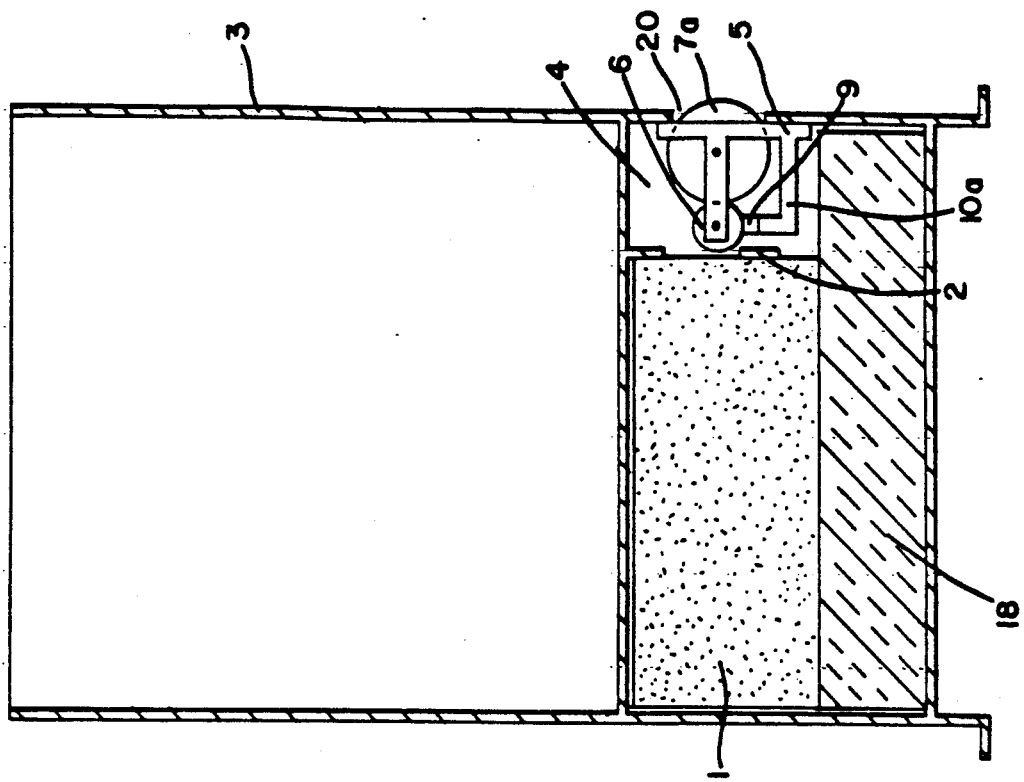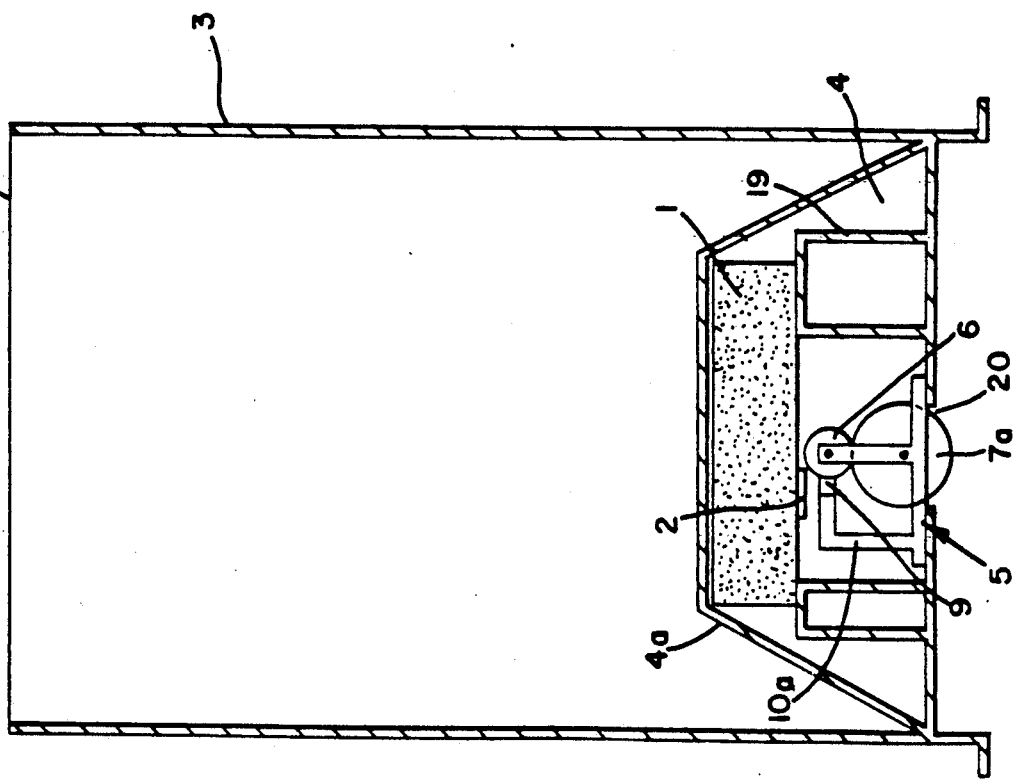

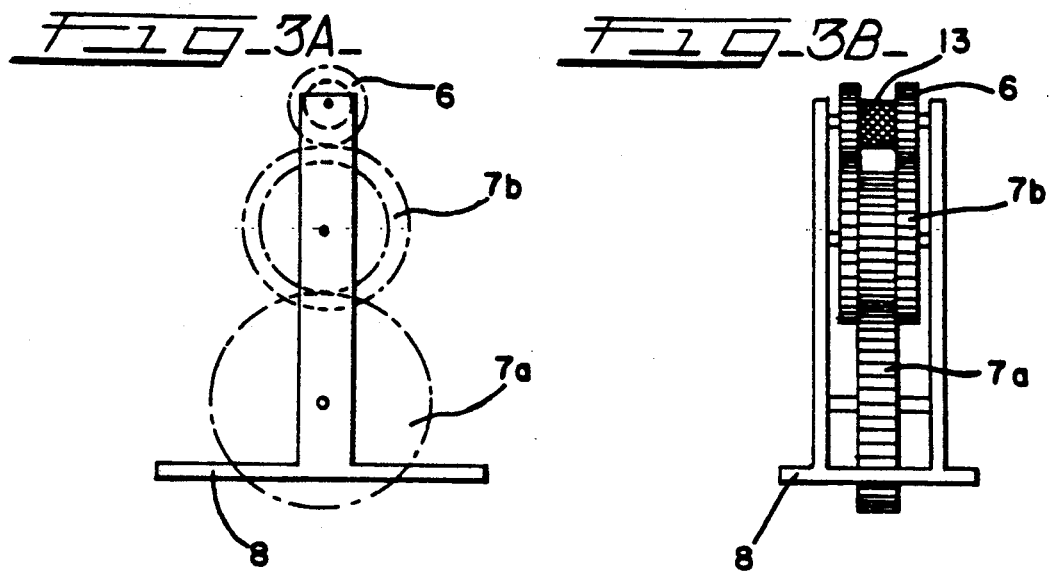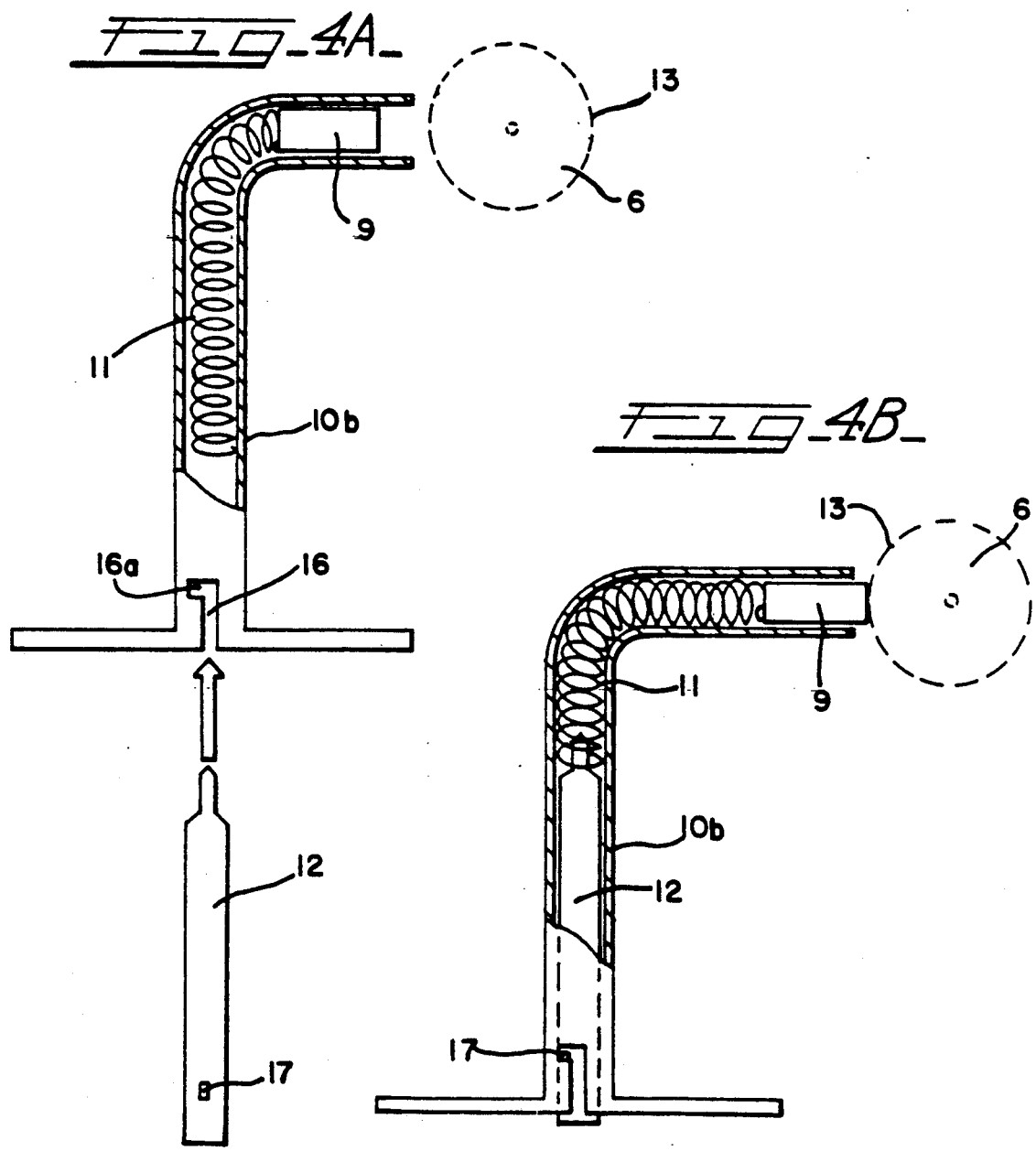

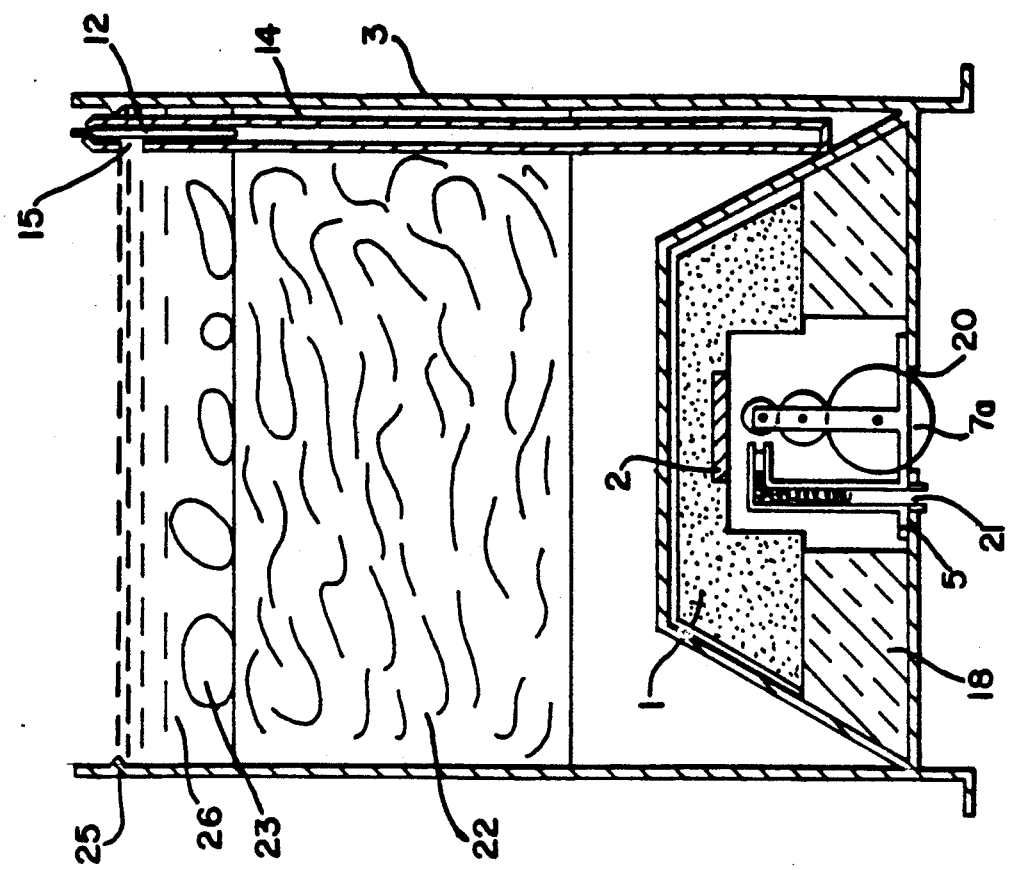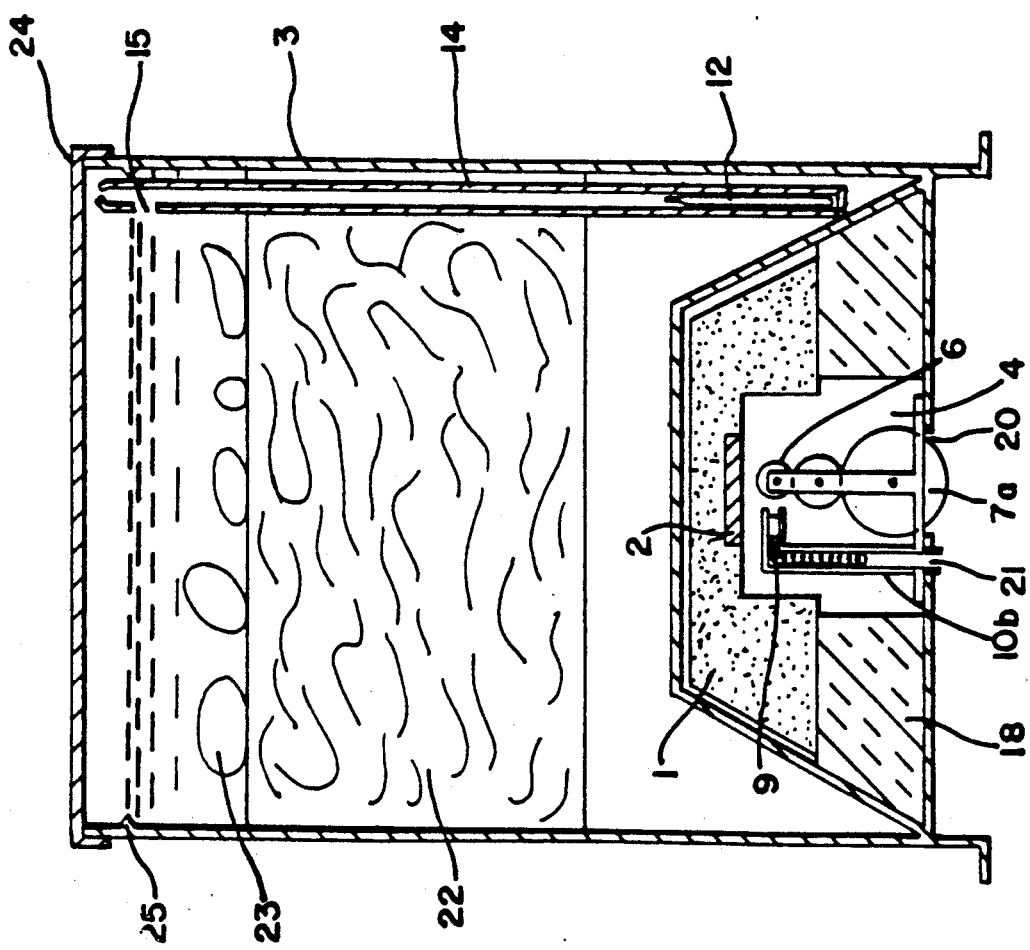

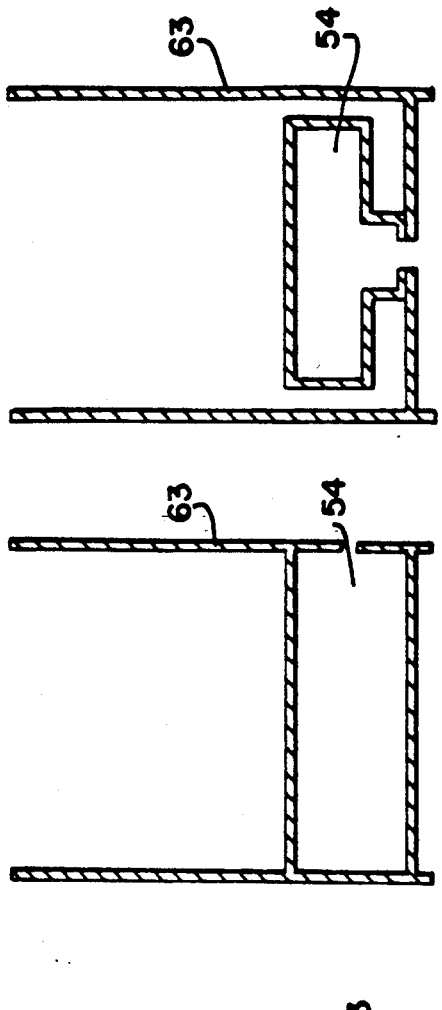
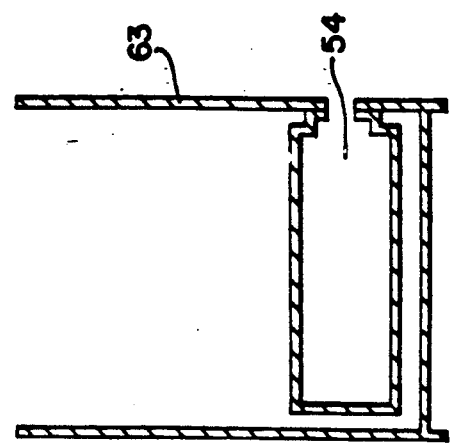
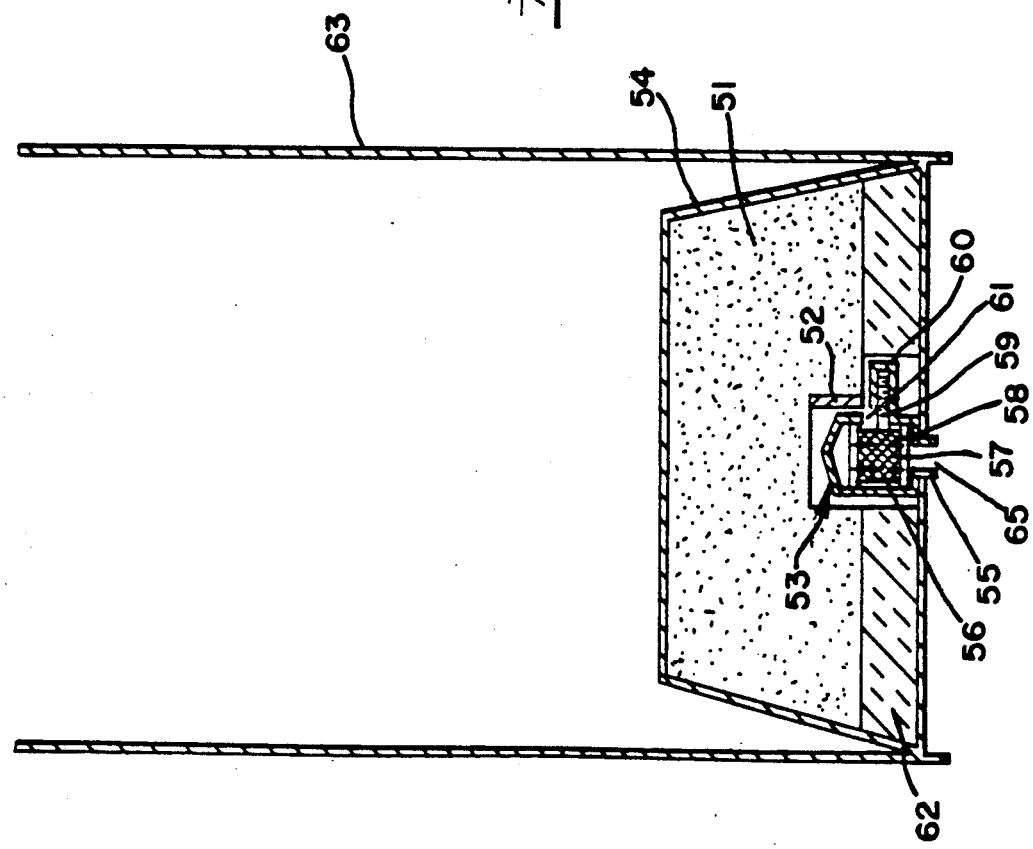

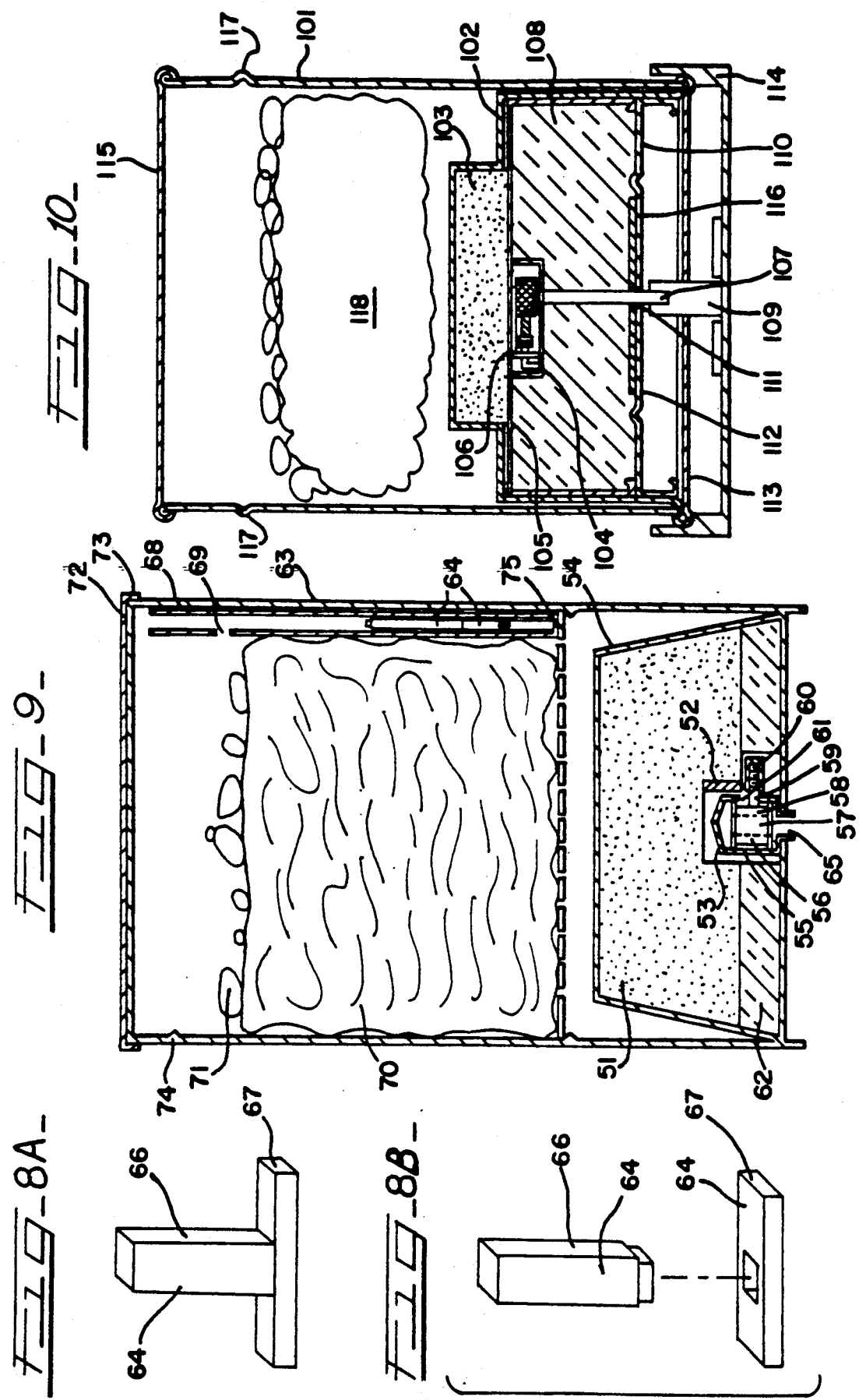

SELF-HEATING CONTAINER

This is a division of application Ser. No. 07/395,768 filed Aug. 18, 1989.

FIELD AND BACKGROUND OF THE INVENTION

This invention relates to a self-heating container, which incorporates a heater.

Some prior art self-heating containers designed to heat the contents thereof by generating heat without using a gas or electric heat source utilize the hydration reaction of calcium oxide, calcium chloride, aluminum, or the like (see, for example, Japanese Utility Model Provisional Publication Nos. 60-70235, 61-89332, 62-93654, etc.). In the foregoing prior art, the heating speed is relatively slow and the calorific value obtained in relation to the volume of the pyrogen is extremely low.

Recently, the use of heat generated by the self-heating reaction of a solid fuel comprising an oxygen-supplying agent and a combustible material is exemplified by Japanese Utility Model Provisional Publication Nos. 62-146427 and 63-42089, according to which the solid fuel is fired by means of a fuse or a filamental electric heater connected to the solid fuel.

The ignition requires a match, lighter, battery or the like resulting in extreme inconvenience. Besides, it is difficult to use a fuse in the rain or in a strong wind when outdoors.

SUMMARY OF THE INVENTION

It is an object of this invention to provide a compact and easy-to-carry container with a heater that is easily, securely, safely and quickly heated both indoors and outdoors, without requiring a match, lighter, battery or other igniter.

A self-heating container according to this invention comprises a container with a heater fixed therein. The heater includes a solid fuel, a firing agent in contact with and easier to fire than the solid fuel, and an igniter including a rotatably supported striker wheel and a flint mounted for compressive engagement with the wheel. The wheel is rotatably engageable from outside the container.

BRIEF EXPLANATION OF THE DRAWINGS

Preferred embodiments of the invention are shown in the accompanying figures of the drawings, wherein:

FIGS. 1 and 2 are sectional views of two embodiments of a self-heating container in accordance with this invention;

FIG. 3-A is a schematic side view of an ignition gear system according to this invention;

FIG. 3-B is a side view of the gear system shown in FIG. 3-A;

FIGS. 4-A and 4-B are side views partially in section of part of the igniter under different conditions;

FIGS. 5-A and B are sectional views of another embodiment of a self-heating container according to this invention, under different conditions;

FIG. 6 is a sectional view of still another form of self-heating container according to this invention;

FIGS. 7-A, B and C are sectional views of three additional forms of containers according to this invention;

FIGS. 8-A and 8-B are perspective views of two forms of ignition triggers according to this invention;

FIG. 9 is a view similar to FIG. 6, but showing a more specific form of a self-heating container; and FIG. 10 is a sectional view of still another form of self-heating container according to this invention.

DETAILED DESCRIPTION OF THE INVENTION

While specific embodiments of the invention are described herein, it will be understood that the invention is not confined to the described embodiments.

In FIGS. 1 and 2, a container 3 has an opening at the top 3a and a housing chamber 4 adjacent the bottom formed by an interior wall 4a. The chamber 4 houses a heater including a self-combustible solid fuel 1, a firing agent 2 and an igniter 5; the solid fuel 1 is supported by a support table 19 (FIG. 1) or placed over an insulator 18 (FIG. 2). The firing agent 2 is fixed to the solid fuel 1, and the igniter 5 is located close to the firing agent so as to ignite the firing agent easily.

The solid fuel 1 comprises a mixture of an oxidation agent and an inflammable material. The oxidation agent may be a metal oxide such as iron oxide, copper oxide or lead oxide; the inflammable material may be titanium, iron or some other metal or semimetal such as silicon that features greater oxidation heat than the metal forming the oxidation agent. The solid fuel may be a mixture of one or more oxidation agents and one or more elementary substances from among the inflammable materials or an alloy. The solid fuel is the so-called self-combustion heating material and when the inflammable material is oxidized by oxygen taken from the oxide, a large amount of oxidation heat is generated.

The firing agent is a mixture of an oxidation agent and an inflammable material, and it easily ignites the solid fuel. The oxidation agent may be barium peroxide, copper oxide or strontium peroxide; the inflammable material may be magnesium, aluminum, calcium or boron. The firing agent may be a mixture of one or more oxidation agents and one or more elementary substances from among the inflammable materials or an alloy. The firing agent generates a large amount of oxidation heat when the inflammable material, such as aluminum or boron, is oxidized by the barium perioxide or other oxidation agent.

The solid fuel requires a large calorific value to be ignited, and cannot easily be ignited with a match, lighter or the like. However, the firing agent, which requires a smaller calorific value to be ignited than does the solid fuel, can be ignited, for instance, at a lower ignition temperature and with less ignition time. Thus the firing agent can be easily ignited even by a small spark generated by an igniter 5 placed nearby. By placing the firing agent in contact with the solid fuel, the heat of the firing agent will ignite the solid fuel.

With reference to FIGS. 1 and 2, the igniter 5 includes a gear system and an ignition part. The gear system includes a striker wheel 6 and a manipulating wheel 7a, which engage each other.

FIGS. 3-A and 3-B show another form of ignition gear system, which includes a two part metal striker wheel 6 with a rough or knurly periphery 13 like a rasp between the two gear parts, and a manipulating wheel 7a, which are interconnected through a gear mechanism by a gear 7b, all of which are rotatably supported on a support 8. The diameter of gear 7b is larger than that of the striker wheel 6 but smaller than that of the wheel 7a.

Any number of such gears may be used to best suit the situation, taking into account operating conditions or necessary torque during operation of the gear system. This gear mechanism reduces the torque of the operating wheel 7a needed to induce ignition.

In FIGS. 1 and 2, the ignition part may be composed of a flint 9 fastened to the tip of a support bar 10a of steel, plastic or some other elastic material and pressed against the rough surface 13 of the striker wheel 6. In the interest of safety at the time of ignition, as will be explained later, it is desirable that the ignition part, which includes a flint 9 and a spring 11 connected to the flint as shown in FIG. 4-A, be housed inside a tubular support 10b. When a rod-like pusher 12 is pushed into the tube from outside, the spring is compressed and the flint 9 is pressed against the rough surface 13 of the striker wheel by the spring 11 as shown in FIG. 4-B.

The pusher 12 is preferably equipped with a holder so that it is not pushed back by the return force of the spring 11 once it is pushed into the support 10b. For instance, as shown in FIG. 4-A, a bayonet-type connection including an L-shaped slit 16 may be provided in the lateral wall of the support 10b and a convex knob 17 provided in the pusher 12; thus, as shown in FIG. 4-B, after inserting the pusher 12 into the support 10b, the knob 17 is turned into a lock part 16a of the slit where it is engaged, making it possible to secure the pusher 12 inside the support.

As shown in FIGS. 1, 2, 5-A and 5-B, the igniter 5 is mounted inside the chamber 4 close to the firing agent 2 on the solid fuel 1. The operating wheel 7a is so mounted that part of it is exposed to the outside of the container 3 through a slot 20 in the bottom (FIG. 1) or side wall (FIG. 2) of the container. Therefore, the operating wheel 7a can be rotated by moving the exposed part by hand, from outside the container 3, making it possible to obtain ignition.

In FIGS. 5-A and 5-B, the igniter is the same as shown in FIGS. 3 and 4. In this embodiment, a hole 21 is provided in the bottom of container 3, and a support 10b is mounted so as to interconnect the inside and outside of chamber 4 through the hole 21.

A pusher 12 may be stored inside the container by suitable ordinary methods, such as by providing an inner lid (not shown) for storing it inside the container 3, over which an upper lid 24 is provided for sealing, but it is better if the pusher is stored inside a slender cylindrical housing 14 provided with a bottom closure plate, and which has a water inlet 15 on the upper lateral side near its upper end, and that this housing be fastened vertically inside the container 3.

The pusher 12 may be made of metal, plastic or wood, but when the pusher is to be stored inside the housing 14, a material with less specific gravity than water, such as plastic or wood, should be used so that the pusher will float when water is added. In use, with reference to FIGS. 5-A and 5-B, materials to be cooked by heating are placed in the container 3. After the pusher 12 is removed from the housing and is inserted into the support 10b of the igniter through the hole 21, the operating wheel 7a is turned, turning the striker wheel 6, and the rough surface 13 of the striker wheel rubs against the flint 9, causing the flint to generate sparks. The sparks ignite the firing agent 2, which generates heat to ignite the solid fuel 1, thereby generating heat for the material to be heated. An insulation 18 under the solid fuel 1 provides protection.

The container of FIGS. 5-A and 5-B would be extremely effective for the storage and cooking by heating of instant dried foods, retorted foods, etc.

With reference to FIG. 5-A, the container 3 contains a cake of instant noodles 22 and dry ingredients 23 and is sealed by lid 24. In the housing 14, the water inlet 15 is located below a recommended water line 25. Because, in this container, the pusher 12 is sealed inside the housing before use and the flint 9 is not in contact with the striker wheel 6, ignition cannot occur accidentally even if the operating wheel 7a is rotated. Therefore, there can be no ignition of the solid fuel or generation of heat, making this container safer because it prevents heating with no water inside, or other accidents due to incorrect operation during transport or storage after manufacture.

With reference to FIG. 5-B, to cook the food contents of the container, the upper lid 24 is removed and water 26 is poured in up to the water line 25. Water enters the housing 14 via the inlet 15, and the pusher 12, made of material with less specific gravity than water, floats up to the upper rim of the housing. The pusher 12 can then be pulled out, and the housing 14 may also be removed from the container 3. The pusher 12 is inserted and fixed into the igniter through the hole 21 in order to press the flint against the wheel, and when the operating wheel 7a is turned by hand, the solid fuel 1 is ignited and the contents are heated and cooked.

In FIG. 6, a container 63 has an opening at the top and a housing wall 54 forming a chamber adjacent the bottom. Regarding the shape of the housing chamber 54, in addition to that in FIG. 6 in which the upper part protrudes inside the container, other shapes may be employed to best suit the situation, such as the flat bottom type in FIG. 7-A, the bottom support type in FIG. 7-B, or the lateral support type in FIG. 7-C.

In FIG. 6, an igniter 53 includes a housing 55 which holds a striker wheel 56 and a flint 59. The striker wheel 56 has a rough exterior surface 58 and an axial bore 57 (which extends axially as seen in FIG. 6) into which a trigger to be described later is engaged to activate the igniter; the flint 59 is pressed against the rough surface 58 of the striker wheel 56 by a spring 60. The bore 57 may be either a through hole or a socket, and its shape should be out-of-round, such as square, trapezoidal, semi-circular, etc. so long as the striker wheel 56 can be rotated when the trigger is turned.

The housing 55 holds the striker wheel 56, flint 59 and spring 60 so that the striker wheel 56 is engaged with and rotatable by a trigger inserted from outside. The bottom of the container 63 is formed with an insertion hole 65 through which to engage the trigger in the bore 57 from outside the container 63. An ignition port 61 is formed near the point of contact between the striker wheel 56 and flint 59 so that the sparks from the flint ignite the firing agent 52, and this port is connected to the firing agent 52. The housing 55 should be made of a heat-resistant metal material such as aluminum. The igniter is positioned on the bottom or side of the container inside the housing so that the firing port is close to the firing agent. The igniter is open to the outside of the container via the insertion hole 65. Therefore, it is possible to carry out ignition by inserting the trigger from outside the container.

The trigger is engaged in the bore 57 of the striker wheel and turned so as to turn the striker wheel, which generates sparks from the flint due to the friction between its rough surface and the flint. As shown in FIG.

8-A, the trigger may include an insertion part 66 and a handle or grip 67 integrally molded or, as shown in FIG. 8-B, the inserting part 66 may be assembled into the grip 67. The insertion part is inserted vertically upwardly into the bore 57 to engage the bore, and then it is rotated. In order to rotate the striker wheel, the shape of the inserting part 66 must, of course, match and engage the bore 57.

The trigger may be stored inside the container by suitable ordinary methods, such as by providing an inner lid for storing it inside, over which an upper lid is provided for sealing. From the standpoint of safety, to be explained later, it is preferable that the disassembled parts 66 and 67 (FIG. 8-B) of the trigger be stored inside a slender housing cylinder with a bottom and which is provided with a water inlet on the bottom or a side wall, and that this housing cylinder be positioned vertically inside the container.

The trigger may be made of metal, plastic or wood. When the trigger is to be stored inside the housing cylinder, a material with less specific gravity than water, such as plastic or wood, should be used so that it will float.

In use, with reference to FIG. 6, materials to be cooked by heating are placed in the container 63; the inserting part 66 of the trigger is engaged in the bore 57 of the striker wheel, and the grip 67 of the trigger is turned. The striker wheel 56 is rotated as the trigger is turned, and the rough surface 58 of the striker wheel rubs against the flint 59, causing the flint to generate sparks. The sparks fly through the ignition port 61 in the igniter, igniting the firing agent 52; the ignition of the firing agent then ignites the solid fuel 51 placed over the heat insulator 62, inducing sufficient heating reaction.

In FIG. 9, the container 63 contains instant noodles 70 and dry ingredients 71. An internal tubular housing 68 that holds a trigger 64 is positioned vertically along the side of the container, an upper lid 72 forms a hermetic seal over which a cover lid 73 is placed. A heat-resistant partition 75 is made of metal or the like and has a large number of small holes in it, and forms a support for the noodles 70. In the housing cylinder 68, a water inlet 69 is formed below a recommended water line marker 74. As, in this container, the trigger 64 is sealed inside, it is impossible to rotate the striker wheel 56 of the igniter 53, so that accidental ignition cannot occur.

To heat and cook the contents, the lids 73 and 72 are removed and water is poured in up to the marker 74. Water enters the housing 68 via the water inlet 69 and the trigger 64, made of material with less specific gravity than water, floats up to the upper rim of the housing. The trigger 64 can then be pulled out, and the housing 68 is removed from the container 63. The inserting part and the grip of the trigger 64 are then assembled and the inserting part of the trigger is engaged in the bore 57 of the striker wheel 56 through the bottom hole 65. When the grip of the trigger is turned, the solid fuel 51 (placed over a heat insulator 62) is ignited, and the contents are heated and cooked.

Since the trigger can only be taken out after pouring in water, any danger of burning up the contents by forgetting to add water is eliminated.

As explained above, heating can be securely and instantly achieved by simply turning the operating wheel or engaging and rotating the trigger, indoors or outdoors; being small and easy to carry, the container is extremely effective for cooking instant noodles, soup, coffee and other dried foods, curry, stew and other retorted foods, and various other foods.

In FIG. 10, at the bottom of an outer container 101, is fitted a solid fuel housing 102. Inside the upper part of housing 102 is mounted a self-combustible solid fuel 103 made up of a main agent composed mainly of silicon-iron alloy and ferric oxide and a firing agent composed of boron and ferric oxide. An ignition mechanism 104 that ignites the solid fuel by means of sparks from a flint, and an insulating material 108 are encased by a pressure lid 110 and a bottom lid 113. The ignition mechanism 104 is fixed inside the housing 102 by means of a metal disk 105 which is made, for example, from sheet iron 0.4 mm thick and shaped like an inverted cup. The insulating material may be zeolite which features superior insulating effects, in addition to odor and gas adsorbing properties. In the lid 110, in addition to a small hole 111 through which a turning bar 107 protrudes, there are small holes 112 at from two to four locations, and a seal 116 made of ceramic fiber; unwoven cloth or paper is placed between the pressure lid and the insulating material to prevent the insulating material from falling out through the small holes.

To carry out ignition, an upper lid 115 is opened and a specified amount of water is poured into the container until it reaches the position of a bead 117 inside the container; a plastic turning bar 109, attached to a plastic bottom lid 114, is engaged with the metal bar 107 which rotates the cylindrical striker that contacts the flint of the ignition mechanism, and the lid 114 may be rotated relative to the container 101. The bottom lid 114 is clipped onto a bead formed at the lower edge of the container 101. The sparks generated by this rotation fly to the solid fuel 103 through a slit 106 in the disk 105, igniting the solid fuel. About two minutes after combustion, the water is boiled, and instant noodles 118 can be made ready to eat in four minutes.

The outer diameter of that part of the metal housing 102 which stores the solid fuel 103 is 10-20 mm smaller than the inner diameter of the container 101 so as to create a large gap in order to prevent the outer wall of the container from getting too hot; and the diameter of that part which stores the insulating material 108 is large so that the difference between it and the inner diameter of the container is only from 1 to 4 mm, leaving almost no gap into which the noodles 118 or any solid material might become lodged. Furthermore, due to the fact that the metal disk 105 of the ignition mechanism is set in contact with the inner wall of the housing 102, the heat generated in the upper part of the ignition mechanism is first transmitted to the housing and then to the water via the disk, making the heating more effective and allowing the insulating layer to be thinner.

What is claimed is:

1. A self-heating container comprising a container, a heater fixed within said container, said heater including a solid fuel, a firing agent adjacent with and easier to fire than said solid fuel, and an igniter mounted adjacent said firing agent, said igniter including a rotatably supported striker wheel and a flint for compressive engagement with said wheel, said wheel being adapted to be rotated by operation from outside said container, said solid fuel and said firing agent each comprising a mixture of an oxidation agent and an inflammable material, said flint being compressed against said striker wheel, said striker wheel having an axial bore, said container having an opening formed adjacent said wheel and aligned with said bore, said bore being adapted for engagement with a trigger from outside of said container through said opening so as to rotate said wheel by said trigger.

2. The container of claim 1, which further comprises a vertical tubular support for supporting said trigger therein, said vertical support being fixed within said container and formed with a hole for water flow therethrough.

* * * * *